United States Patent

Meschkat et al.

Patent Number: 5,553,920
Date of Patent: Sep. 10, 1996

[54] SEAT CUSHION ADJUSTMENT FOR VEHICLE SEATS

[75] Inventors: Reinhard Meschkat, Ahorn; Hans Rampel, Ahorn-Schorkendorf; Thomas Rodde, Coburg, all of Germany

[73] Assignee: Brose Fahrzeugteile GmbH & Co. KG, Coburg, Germany

[21] Appl. No.: 417,979

[22] Filed: Apr. 6, 1995

Related U.S. Application Data

[62] Division of Ser. No. 96,556, Jul. 23, 1993.

[30] Foreign Application Priority Data

Jul. 24, 1992 [DE] Germany .................. 42 24 458.7

[51] Int. Cl.⁶ ............................................ A47C 1/02
[52] U.S. Cl. .................. 297/344.14; 297/344.1; 297/337
[58] Field of Search ...................... 297/340, 311, 297/313, 316–318, 322, 383, 344.1, 344.14, 344.12, 344.13, 337; 248/420, 429

[56] References Cited

U.S. PATENT DOCUMENTS

| | | | |
|---|---|---|---|
| 809,944 | 1/1906 | Hanger | 297/318 X |
| 3,572,829 | 3/1971 | Malitte | 297/317 |
| 4,767,156 | 8/1988 | Yamada et al. | 297/313 |
| 4,781,414 | 11/1988 | Periou | 297/313 |
| 5,145,232 | 9/1992 | Del Monte | 297/322 X |

FOREIGN PATENT DOCUMENTS

| | | | |
|---|---|---|---|
| 479006 | 4/1992 | European Pat. Off. | 297/316 |
| 3033953 | 5/1981 | Germany | 297/340 |

*Primary Examiner*—Milton Nelson, Jr.
*Attorney, Agent, or Firm*—Christie, Parker & Hale, LLP

[57] ABSTRACT

A seat cushion adjustment device depends on an adjustment path of at least one main adjustment of the seat and serves to define a development curve of the seat cushion adjustment individually and ergonomically. The seat cushion adjustment device includes a first adjustment device for a main adjustment of the vehicle seat within a defined adjustment area and a second adjustment device coupled to the first adjustment device for adjusting the seat cushion in dependence on a main adjustment of the seat cushion in dependence on a main adjustment of the vehicle seat. The seat cushion adjustment device also includes a separate adjustment device coupled to said first or second adjustment device for fixing the development curve of the seat cushion adjustment device within a restricted adjustment area, whereby the extreme positions of the seat cushion are associated with the extreme positions of at least one main adjustment of the vehicle seat.

17 Claims, 4 Drawing Sheets

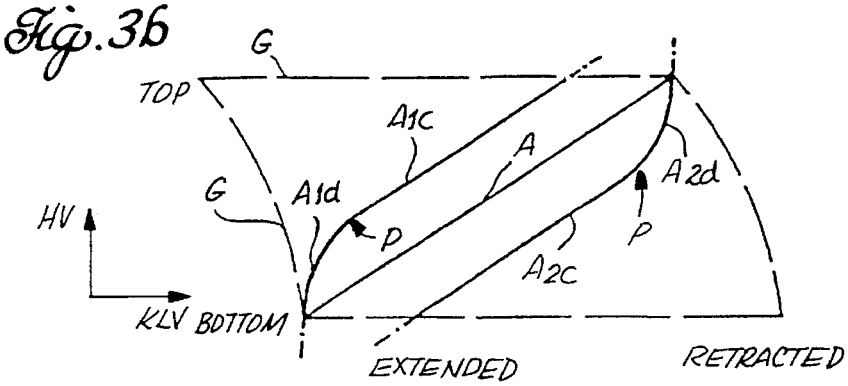
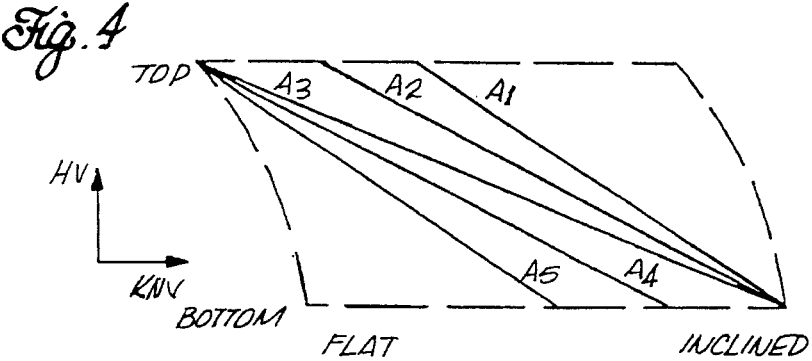
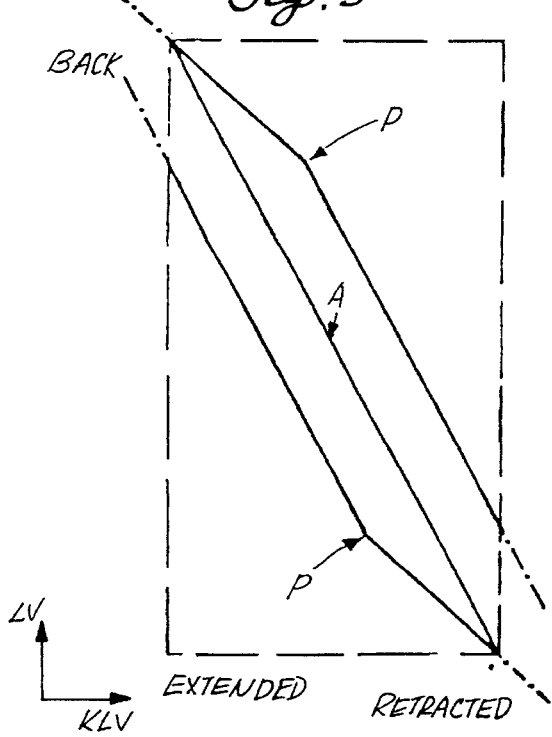
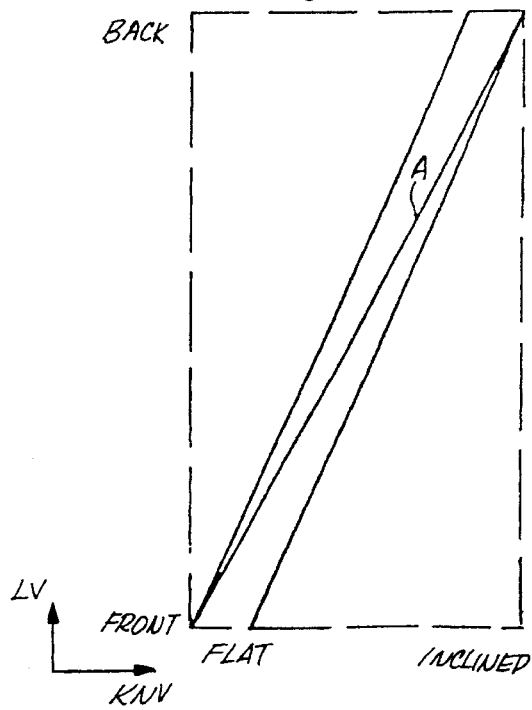

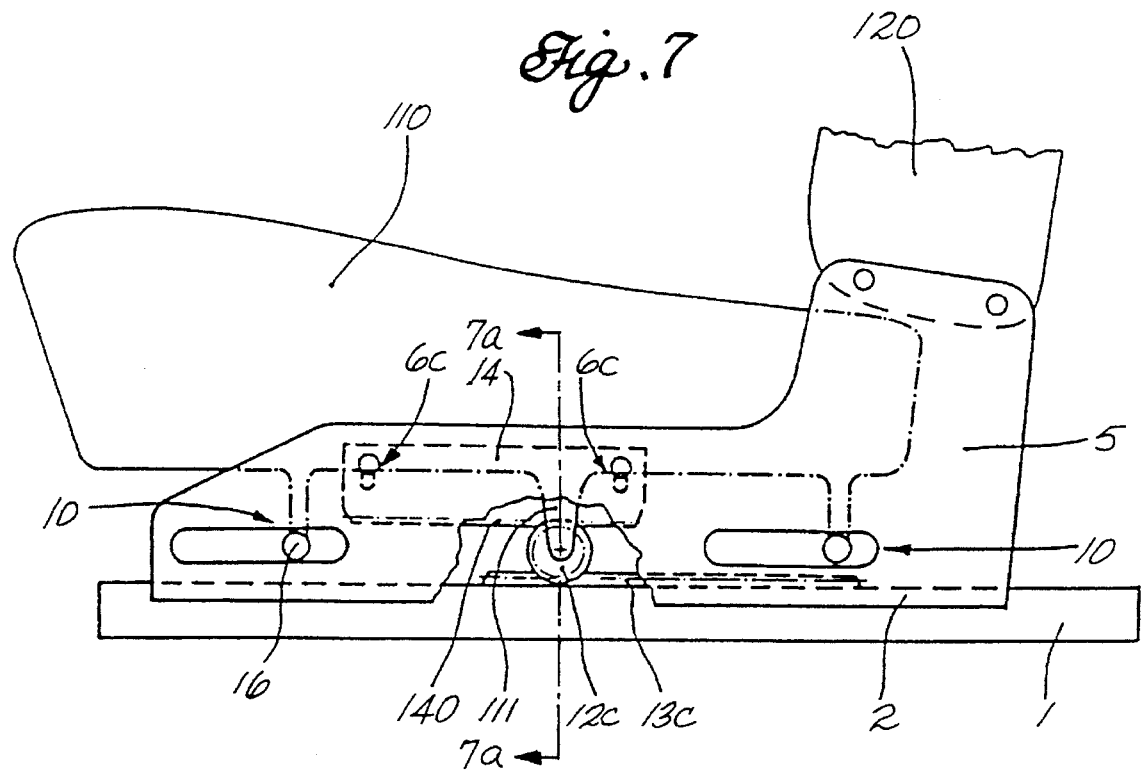
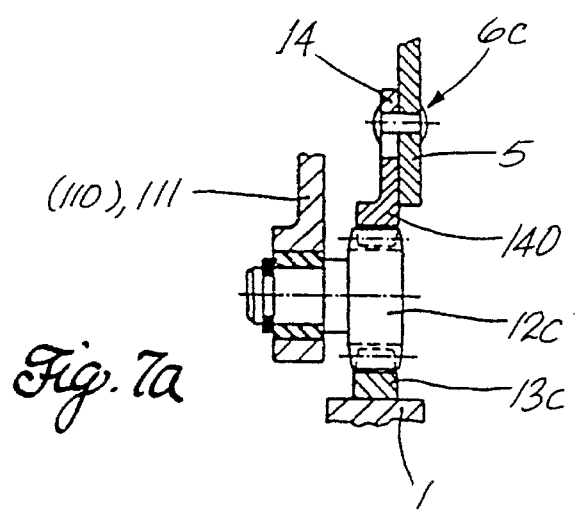

SEAT CUSHION ADJUSTMENT FOR VEHICLE SEATS

RELATION TO COPENDING APPLICATIONS

This patent application is a divisional application of parent U.S. patent application Ser. No. 08/096,556 that was filed on Jul. 23, 1993, and is hereby incorporated by reference.

BACKGROUND OF THE INVENTION

The invention relates to a seat cushion adjustment for vehicle seats, more particularly for seats of motor vehicles, which depend on the adjustment path of at least one main adjustment of the seat and serves to adapt the development curve of the cushion adjustment individually and ergonomically.

The document JP 61-181729 describes a seat cushion adjustment device whose cushion incline adjustment is coupled directly to the adjustment path of the seat height adjustment through a plurality of levers. The development curve of the dependent cushion adjustment is fixed by the arrangement of connecting points between the levers and the seat frame. A rotary slide joint defines the edges of the adjustment area. As the seat is raised, a swivel movement of the displaceably mounted front part of the seat cushion is initiated at the same time whereby its incline is increased. Similarly lowering the seat leads to a reduction in the incline of the cushion.

The disadvantage of the solution described is that people whose physique differs from the standards used in the design of the seat often find it difficult to find an ideal or comfortable sitting position. This is particularly desirable however where a long journey leads to body fatigue.

SUMMARY OF THE INVENTION

The object of the invention is to develop a seat cushion adjustment which is controlled in dependence on the adjustment path of at least one main adjustment and whose development curve can moreover be adapted within a restricted adjustment area to the individual requirements. A simple easily handled adjustment of several conforming seat parameters prevents the onset of fatigue and relax the person.

According to the invention, a seat cushion adjustment for a vehicle seat comprises first adjustment means for a main adjustment of the vehicle seat within a defined adjustment area, second adjustment means coupled to said first adjustment means for adjusting the seat cushion in dependence on a main adjustment of the vehicle seat whereby said first and second adjustment means define a development curve of the seat cushion adjustment, and separate adjustment means coupled to said first or second adjustment means for fixing the development curve of the seat cushion adjustment within a restricted adjustment area whereby the extreme positions of the seat cushion are associated with the extreme positions of at least one main adjustment of the vehicle seat.

The invention creates a seat cushion adjustment with a separate adjustment by means of which the development curve can be fixed. The extreme positions of the seat cushion, thus its maximum or minimum incline and its furthest front and furthest back position thereby correspond to the extreme positions of at least a main adjustment, thus the seat length adjustment and/or seat height adjustment. It is thereby ensured that a different fixed development curve of the dependent cushion adjustment does not lead to exceeding the predetermined outer adjustment area limits.

Controlling the seat cushion adjustment in dependence on a main adjustment can be carried out through mechanical gearing, e.g., through a non-uniformly translating coupling gear. To this end the coupling lever which connects the seat cushion adjustment to the main adjustment has an adjustable connecting point. If a push-in connection with discrete push-in points (connecting points) is used then the development curve is likewise fixed discretely, i.e., stepped within the adjustment area.

When using a cam plate or the like for adjustment an infinite adjustment, is possible which likewise fixes the development curve of the seat cushion infinitely inside the adjustment area.

Another variation of the invention proposes the use of a non-uniformly translating gearwheel gearing. The change in the translation ratio can thereby be effected suddenly or continuously. A sudden change can be effected if the adjustment path divided up into areas is brought into engagement with gearwheels having different numbers of teeth, such as explained for example in EP 0 443 745. However a continuous change in the translation ratio can also be used. Here the gearing modulus of the interengaging gearing elements changes continuously. As a rule it is not possible for the gearing elements with this type of teeth to turn more than 360°. An example of this type of gearing is provided by the technical solution according to U.S. Pat. No. 4,998,379.

A separate drive for the seat cushion adjustment which is controlled in dependence on the adjustment path of one or more main adjustments offers the most degrees of freedom. With this practically any dependence on several main adjustments can be provided and it can be used particularly favorably in connection with already existing control electronics. In particular, an electric or electronic control unit for controlling the separate drive might be provided. Preferably, the seat also has a memory unit to make it possible to relocate a desired adjustment setting.

However it must be noted that the advantage of saving a drive unit for the adjustable cushion with this embodiment will not be effective unless one motor drives several adjustments in succession with the interposition of a distributor gear.

Preferably, the seat cushion adjustment is carried out both in length (depth) and in incline. This can be ensured through the separate use of the previously described types of gearing. However a seat cushion incline adjustment dependent on the seat cushion length adjustment can however also be selected by using for example a suitably inclined or curved slide displacement.

The invention thus provides numerous requirements for adapting the development curves of several coupled seat adjustment paths to the individual needs of the user. Setting the different comfortable sitting positions is made much easier and can be reached in a very short time. Thus the seat can be changed when driving practically without diverting the attention from the surrounding traffic.

BRIEF DESCRIPTION OF THE DRAWINGS

The features of the specific embodiments of the best mode contemplated of carrying out the invention are illustrated in the drawings, in which:

FIG. 3b shows a discrete group of development curves of a cushion length adjustment (KLV) with continuously changing translation ratio and stepped adjustment in dependence on the height adjustment (HV);

FIG. 4 shows a group of discrete development curves of a cushion incline adjustment (KNV) in dependence on a height adjustment (HV) with direct adjustment;

FIG. 5 shows a group of discrete development curves of a cushion length adjustment (KLV) in dependence on the length adjustment (LV) with stepped adjustment and suddenly changing translation ratio;

FIG. 6 shows a group of discrete constantly running development curves of a cushion incline adjustment (KNV) in dependence on the length adjustment (LV) with sudden adjustable adjustment;

FIG. 7 is a diagrammatic view of an adjustable vehicle seat wherein the cushion length adjustment (KLV) is coupled to the length adjustment (LV);

FIG. 7a is a section through the coupling gear according to FIG. 7;

DETAILED DESCRIPTION OF THE SPECIFIC EMBODIMENT

First of all the principle of the invention will be explained with reference to the development curves of the seat cushion adjustments which are dependent on one or more main adjustment paths. The illustrated field limits can be thought of as sections of an H-field.

A seat length adjustment (LV) is a length adjustment of the vehicle seat with respect to the vehicle chassis. A seat height adjustment (HV) is a height adjustment of the vehicle seat with respect to the vehicle chassis. A seat cushion length adjustment (KLV) is a length adjustment of the seat cushion with respect to the vehicle seat. A seat cushion incline adjustment (KNV) is an incline adjustment of the seat cushion with respect to the vehicle seat.

Figure 1:
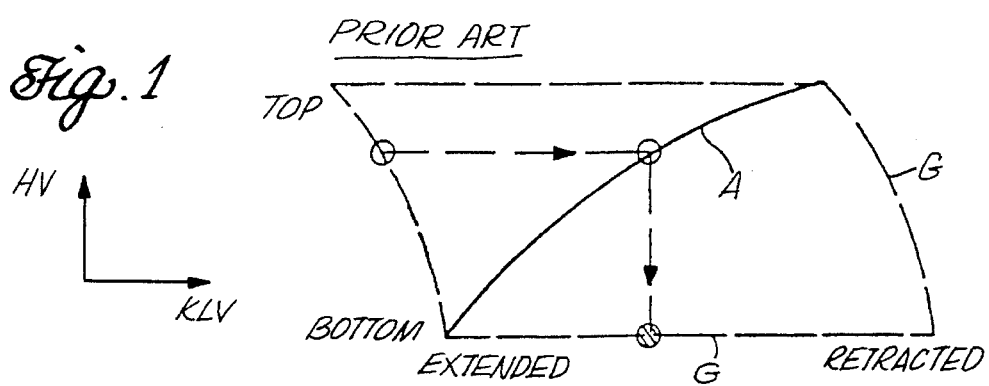
FIG. 1 shows the development curve of a cushion length adjustment (KLV) in dependence on the height adjustment (HV as main adjustment) of the seat according to the prior art.

FIG. 1 shows a seat cushion length adjustment (KLV) dependent on the height adjustment (HV) as known according to the prior art. A seat cushion length is accurately associated with each seat height through the fixed development curve A inside the boundary G of the adjustment area of the seat cushion. Variations of the parameters of height adjustment HV and cushion length adjustment KLV are not possible.

Figure 2A:
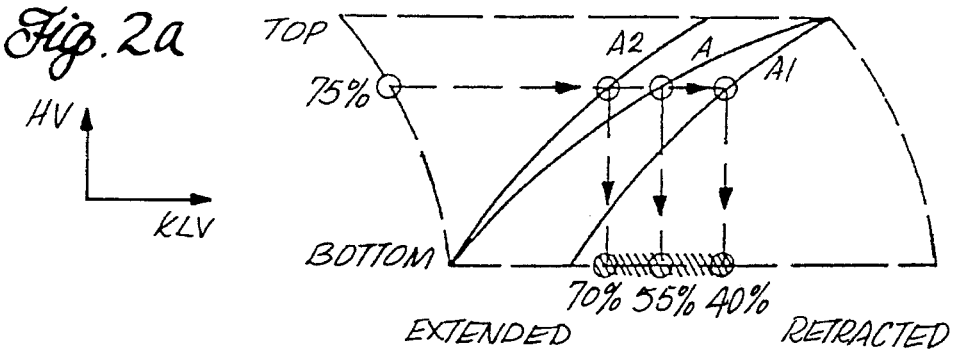
FIG. 2a shows the discrete group of development curves of a cushion length adjustment (KLV) with stepped adjustment in dependence on the height adjustment (HV)

FIG. 2a shows a group of three development curves A, A1, A2 of a cushion length adjustment KLV in dependence on a height adjustment HV which can be fixed by a stepped adjustment. According to this diagrammatic illustration three seat cushion lengths are associated with one seat height:

With a seat height of about 75% of its maximum value and the setting of the development curve A the seat cushion is extended up to about 55% of its adjustment length. If however the development curves A1 or A2 were chosen then the cushion length adjustment KLV reaches 40% or 70% respectively of its adjustment path. Even with this variation which only provides two further development curves A1, A2 right and left of the usual development curve A the user of the seat is offered a substantially variable adjustment range. The development curves A1 and A2 supply in principle different adjustment characteristics of the seat. Thus the development curve A1 is found more acceptable by a driver with shorter than average legs whilst a user with particularly long legs will select development curve A2.

Figure 2B:
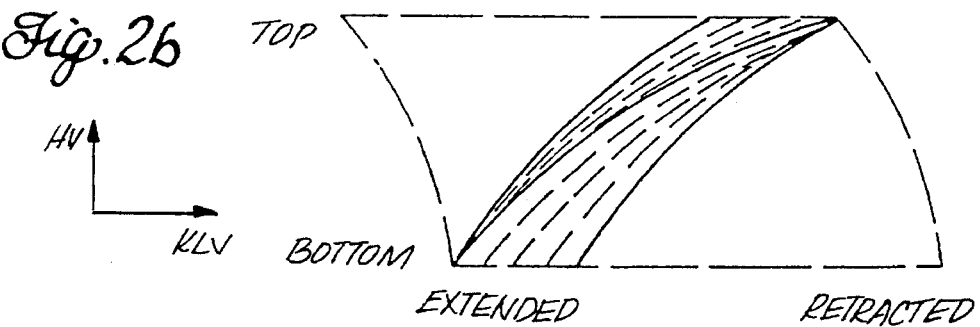
FIG. 2b shows the field of the groups of development curves of a cushion length adjustment (KLV) with infinite adjustment in dependence on the height adjustment (HV).

FIG. 2b shows a field of groups of development curves of a cushion length adjustment KLV which can be used by means of an indefinitely variable adjustment in dependence on the height adjustment HV. Practically any point can be set here within the adjustment area.

Figure 3A:
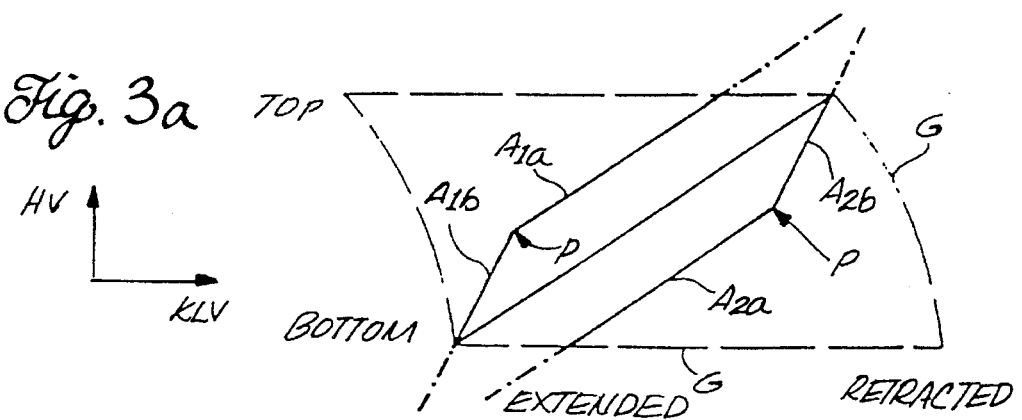
FIG. 3a shows a discrete group of development curves of a cushion length adjustment (KLV) with suddenly changing translation ratio and stepped adjustment in dependence on the height adjustment (HV)

Whereas the development curves explained hitherto are the result of coupling levers and thus of non-uniformly translating gearing the group of development curves shown in FIG. 3a of a cushion length adjustment KLV is produced by an adjustment which is indeed likewise dependent on a height adjustment but which has available at least one area with uniform translation ratio. So as not to exceed the limits G of the adjustment area the development curves $A_{1a}$ and $A_{2a}$ have a suddenly changed rise which runs into the area $A_{1b}$ and $A_{2b}$. These development curves are technically convertible through a suddenly changed translation ratio of a gear rod gear.

FIG. 3b shows similar conditions to FIG. 3a. However the continual translation ratio of the development curves $A_{1c}$ and $A_{2c}$ changes continuously into the constantly changing translation ratio of the development curve sections $A_{1d}$ and $A_{2d}$.

Setting one or other development curves right or left of the development curve A is carried out by changing the relative position of the gearbox parts in respect of each other. According to the diagrammatic illustration of FIG. 4 the cushion incline adjustment KNV depends on the height adjustment HV. The stepped adjustment allows the fixing of overall 5 different development curves A1, A2, A3, A4, A5 of which each two lie right and left of the main development curve $A_3$. The automatic coupling of the seat cushion incline is carried out so that it occupies its flattest position at maximum height of the seat and its greatest incline at the minimum height of the seat.

Whereas for example when selecting the outermost right hand development curve $A_1$ in the uppermost seat position a minimum of about 50% of the possible cushion incline is reached, the seat cushion incline according to the development curve $A_5$ in the lowermost seat position still has about half its value.

FIGS. 5 and 6 show development curves for the longitudinal and incline adjustments respectively of the cushion which are dependent on the main adjustment path of the seat length adjustment.

Whereas the lateral development curves of the seat cushion length adjustment (FIG. 5) are characterized by a suddenly altered translation ratio at point P, the development curves of the cushion incline adjustment (FIG. 6) have a continuous steady course. Both figures show a discrete group of three development curves whose individual preselection can be carried out through stepped adjustment.

Development curves of multi-dependent seat adjustments, i.e., seat adjustments wherein either two dependent adjustment paths are controlled by a main adjustment or wherein two main adjustment paths control one dependent or even several dependent seat parameters were not shown on account of their costly design. Examples for technical conversions here are however given below.

FIG. 7 shows a variation of the invention which brings about the coupling of different seat adjustment paths not by levers but by a toothed rod pinion gear. According to this a toothed rod 13c is mounted in the adjustment area of the seat where it is connected to the lower rail 1 and engages the pinion 12c. At the same time this pinion 12c meshes with the toothed rod 140 which is molded on the adjustment plate 14. The pinion 12c is mounted on the entrainment dog 111 which angles off from the trough of the seat cushion 110. The adjustment plate 14 can be raised by the oblong guides 6c and displaced relative to the remaining gear parts 12c, 13c. Fixing the development curve and adapting the cushion length adjustment KLV are thereby carried out in dependence on the length adjustment LV of the seat. FIG. 7a shows a sectional view clarifying the gear area.

When operating the seat length adjustment the described kinematics causes a relative movement between the seat side part 5 and the seat cushion 110 guided in the slide guides 10 via pins 16 attached to the seat cushion. Since one and the same pinion 12c engages the two toothed rods 13c and 140 the translation ratio amounts to 1:2, i.e., when the seat frame is moved back by 2 cm then the seat cushion 110 is displaced forward relative to the seat side part 5 by 1 cm. Moving the seat frame forward produces a corresponding relative movement of the seat cushion 110 in the opposite direction.

Figure 8:
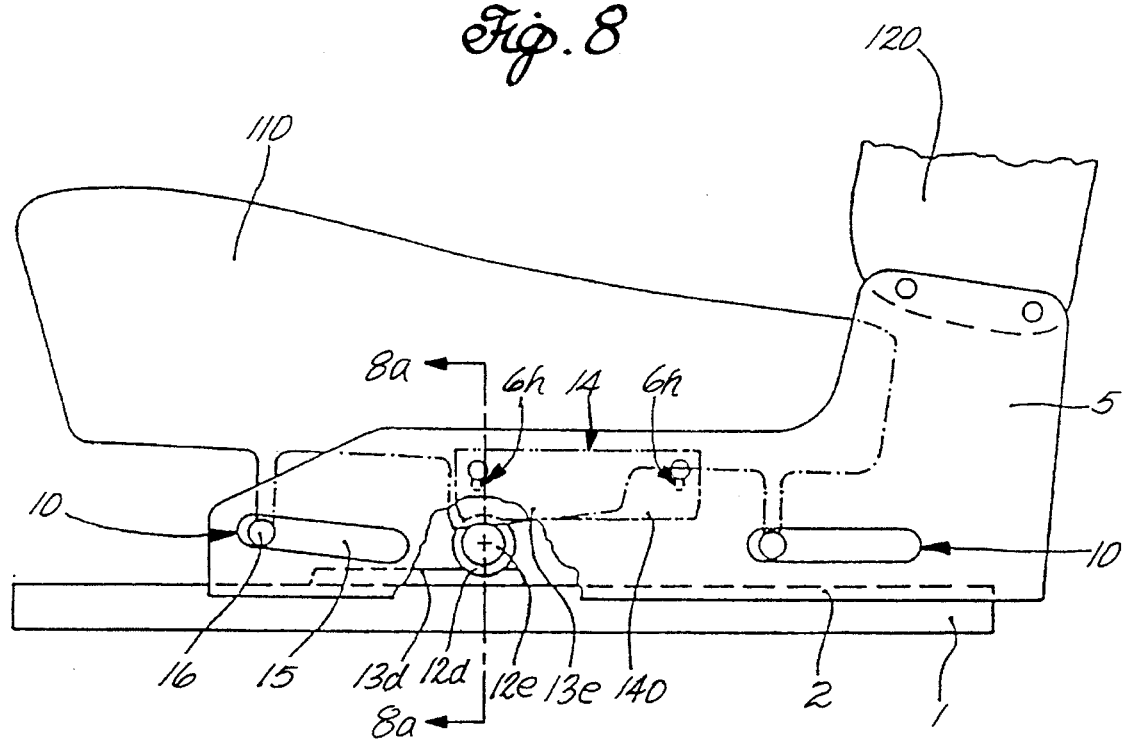
FIG. 8 is a diagrammatic view of an adjustable vehicle seat wherein the cushion length adjustment (KLV) and the cushion incline adjustment (KNV) are coupled simultaneously to the length adjustment (LV)

The modified embodiment according to FIG. 8 shows a seat adjustment kinematics whose cushion length adjustment KLV and cushion incline adjustment KHV are dependent on the length adjustment KV of the seat. For this the larger of the two-phase pinions 12d, 12e rolls down on the toothed rod 13d (connected with the lower rail) and the toothed rod 140 (molded on the adjustment plate 14). The adjustment plate 14 is fixed on the seat side part 5 which in turn is connected to the top rail 2. The toothed rod 13e which is connected to the seat trough of the seat cushion 110 meshes with the smaller pinion 12e. It is mounted in relation to the seat rails 1, 2 with a defined reverse incline like the front slide channel 15. This correlation is decisive for the functional reliability of the seat adjustment according to the invention.

When operating the length adjustment the gear wheels 12d, 12e roll freely but are guided axially on the toothed rods 13d, 140, 13e. Owing to the difference in diameter between the gearwheels 12d, 12e a stabilizing effect of the seat cushion 110 takes place at the same time relative to the seat side part 5 which in proportion to the amount of the length adjustment is smaller than 1:2. Movement between the seat cushion 110 and side part 5 is guided by the placement of pins 16, attached to the seat cushion, within slide guides 110 in the side part 5.

This can mean for example that a forward movement of the seat rail by 10 cm has a reaction of a reverse movement of the seat cushion 110 by 2 cm whereby the front edge of the seat cushion 110 actually only carries out a movement of 8 cm relative to the floor of the vehicle.

Figure 8A:
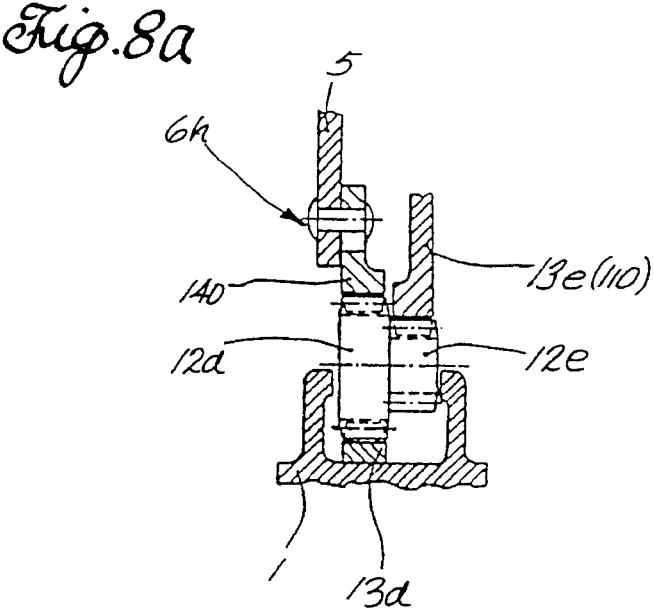
FIG. 8a is a section through the coupling gear according to FIG. 8.

FIG. 8a shows diagrammatically a cross-section through the gear area of the previously described seat adjustment.

While the invention has been described in detail with respect to certain preferred embodiments, it should be understood that the invention is not limited to those precise embodiments, and that those embodiments are instead representative examples of the many modifications and variations which would present themselves to those of skill in the art without departing from the scope and spirit of this invention, as defined in the appended claims.

What is claimed is:

1. A seat cushion adjustment device for a vehicle seat comprising:

a pair of seat frame side parts, for attachment to opposite sides of the vehicle seat;

a seat cushion carried by the side parts;

first adjustment means for a main adjustment of the vehicle seat within a defined adjustment area;

second adjustment means coupled to said first adjustment means for adjusting the seat cushion in dependence on the main adjustment of the vehicle seat, whereby said first and second adjustment means define a development curve for movement of the seat cushion; and separate adjustment means coupled to said second adjustment means for fixing the development curve of the seat cushion adjustment within a restricted area, whereby maximum adjustment positions of the seat cushion are associated with maximum adjustment positions of at least one main adjustment of the vehicle seat to avoid exceeding predetermined outer range limits of the seat cushion adjustment, wherein said separate adjustment means includes:

a first slide guide formed in each side part to facilitate longitudinal only movement of the seat cushion; and a second slide guide formed in each side part to facilitate seat cushion movement selected from the group consisting of longitudinal movement and incline movement.

2. The seat cushion adjustment device as recited in claim 1, wherein said first and second adjustment means are coupled together by mechanical gearing.

3. The seat cushion adjustment device as recited in claim 1 wherein the first adjustment means is adopted to adjust a longitudinal position of the vehicle seat.

4. The seat cushion adjustment device as recited in claim 1 wherein the separate adjustment means comprises at least one pin attached to the seat cushion that projects into respective slide guides, whereby placement of the at least one pin against closed ends of the slide guides defines an adjustment limit for the seat cushion relative to the seat.

5. A seat cushion adjustment device for a vehicle seat comprising:

a seat cushion;

first adjustment means for a main adjustment of the vehicle seat within a defined adjustment area, wherein the first adjustment means comprises:
a seat rail for accommodating longitudinal slidable movement of the vehicle seat thereon; and
a toothed rod attached to the seat rail;

second adjustment means coupled to said first adjustment means for adjusting the seat cushion in dependence on the main adjustment of the vehicle seat, whereby said first and second adjustment means define a development curve for movement of the seat cushion; and separate adjustment means coupled to adjustment means selected from the group consisting of said first adjustment means and said second adjustment means for fixing the development curve of the seat cushion adjustment within a restricted area, whereby maximum adjustment positions of the seat cushion are associated with maximum adjustment positions of at least one main adjustment of the vehicle seat to avoid exceeding predetermined outer range limits of the seat cushion adjustment.

6. The seat cushion adjustment device as recited in claim 5 wherein the second adjustment means comprises:

an adjustment plate adopted to be attached to the seat cushion; and a toothed rod attached to the adjustment plate.

7. The seat cushion adjustment device as recited in claim 6 wherein said first and second adjustment means are coupled together by a toothed rod pinion gear interposed between the toothed rod of the seat rail and the toothed rod of the adjustment plate, wherein rotational movement of the toothed rod pinion gear effects longitudinal movement of the seat cushion and seat rail in opposite directions.

8. The seat cushion adjustment device as recited in claim 6 wherein the second adjustment means comprises:

a first gear wheel having a toothed portion engaged with a toothed rod of the seat cushion;

a second gear wheel having a toothed portion engaged with the toothed rod of the seat rail, wherein the second gear wheel is axially connected with the first gear wheel, wherein rotational movement of the first and second gear wheels effects longitudinal movement of the seat cushion and seat rail in opposite directions.

9. The seat cushion adjustment device as recited in claim 8 wherein the first gear wheel has an outside diameter less than an outside diameter of the second gear wheel, whereby rotational movement of the first and second gear wheels effects greater longitudinal movement of the seat cushion than that of the seat.

10. A seat cushion adjustment device for simultaneously adjusting a seat cushion of a vehicle seat in a vehicle while adjusting forward and rearward placement of the vehicle seat within the vehicle, the device comprising:

a pair of seat frame side parts for attachment to opposite sides of the vehicle seat;

a seat cushion carried by the side parts;

a first adjustment means for adjusting longitudinal placement of the vehicle seat within a vehicle;

a second adjustment means coupled to the first adjustment means by at least one mechanical gear for adjusting at least longitudinal placement of the seat cushion relative to the seat, wherein movement of the second adjustment means is dependent on movement of the first adjustment means, and wherein said first and second adjustment means define a development curve of the seat cushion adjustment; and separate adjustment means coupled to said second adjustment means for fixing the development curve of the seat cushion adjustment within a restricted area, whereby maximum adjustment positions of the seat cushion are associated with maximum adjustment longitudinal positions of the vehicle seat to avoid exceeding predetermined outer range limits of the seat cushion adjustment, wherein said separate adjustment means includes:

a first slide guide formed in each said side part to facilitate longitudinal only movement of the said seat cushion; and a second slide guide formed in each said side part to facilitate seat cushion movement selected from the group consisting of longitudinal movement and incline movement.

11. A seat cushion adjustment device for simultaneously adjusting a seat cushion of a vehicle seat in a vehicle while adjusting forward and rearward placement of the vehicle seat within the vehicle, the device comprising:

a seat cushion;

a first adjustment means for adjusting longitudinal placement of the vehicle seat within a vehicle, wherein the first adjustment means comprises:

a vehicle seat rail for accommodating longitudinal slidable displacement of a vehicle seat disposed thereon; and a toothed rod attached to the seat rail;

a second adjustment means coupled to the first adjustment means by at least one mechanical gear for adjusting at least longitudinal placement of the seat cushion relative to the seat, wherein movement of the second adjustment means is dependent on movement of the first adjustment means, and wherein said first and second adjustment means define a development curve of the seat cushion adjustment; and separate adjustment means coupled to said second adjustment means for fixing the development curve of the seat cushion adjustment within a restricted area, whereby maximum adjustment positions of the seat cushion are associated with maximum longitudinal adjustment positions of the vehicle seat to avoid exceeding predetermined outer range limits of the seat cushion adjustment.

12. The seat cushion adjustment device as recited in claim 11 wherein the second adjustment means comprises:

an adjustment plate attached to the seat cushion; and a toothed rod attached to the adjustment plate.

13. The seat cushion adjustment device as recited in claim 12 wherein the at least one mechanical gear comprises a toothed rod pinion gear interposed between the first and second adjustment means, wherein the toothed rod pinion gear engages the toothed rod of the seat rail at one end, and engages the toothed rod of the adjustment plate at an opposite end, and wherein rotational movement of the toothed rod pinion gear effects longitudinal movement of the seat cushion and seat rail in opposite directions.

14. The seat cushion adjustment device as recited in claim 13 wherein the separate adjustment means comprises:

at least one slide guide in the form of longitudinal openings disposed in a frame of the vehicle seat; and at least one pin attached to the seat cushion that projects into a respective said at least one slide guide, whereby placement of the at least one pin against closed ends of the at least one slide guide defines an adjustment limit for the seat cushion relative to the seat.

15. The seat cushion adjustment device as recited in claim 11 wherein the at least one mechanical gear comprises:

a first gear wheel having a toothed portion engaged with a toothed rod of the seat cushion; and a second gear wheel having a toothed portion engaged with the toothed rod of the seat rail, wherein the second gear wheel is axially connected with the first gear wheel, and wherein rotational movement of the first and second gear wheels effects longitudinal movement of the seat cushion in a direction opposite from that of the seat rail.

16. The seat cushion adjustment device as recited in claim 15 wherein the first gear wheel has an outside diameter smaller than an outside diameter of the second gear wheel, whereby rotational movement of the first and second gear wheels effects relatively greater longitudinal movement of the seat cushion than oppositely directed longitudinal movement of the seat rail.

17. The seat cushion adjustment device as recited in claim 15 wherein the second adjustment means simultaneously adjusts a longitudinal position of the seat cushion and an incline of the seat cushion.

* * * * *